US008335132B2

(12) United States Patent
Arena

(10) Patent No.: US 8,335,132 B2
(45) Date of Patent: Dec. 18, 2012

(54) SYSTEM AND METHOD FOR DETERMINING LOCAL TIME AT AN ELECTRONIC DEVICE

(75) Inventor: Scott D. Arena, Peabody, MA (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 537 days.

(21) Appl. No.: 12/652,274

(22) Filed: Jan. 5, 2010

(65) Prior Publication Data

US 2011/0164472 A1 Jul. 7, 2011

(51) Int. Cl.
*G04B 19/22* (2006.01)
*G04C 11/00* (2006.01)
*H04W 24/00* (2009.01)

(52) U.S. Cl. .......................... 368/21; 368/46; 455/456.2

(58) Field of Classification Search .................... 368/10, 368/21, 46, 47; 455/456.2
See application file for complete search history.

(56) References Cited

U.S. PATENT DOCUMENTS 6,101,370 A * 8/2000 Eaton et al. .................. 340/7.25
7,948,832 B1 * 5/2011 Luo et al. ........................ 368/21
8,054,820 B2 * 11/2011 Park .............................. 370/350
2003/0115258 A1 * 6/2003 Baumeister et al. .......... 709/203
2007/0140062 A1 * 6/2007 Punkka ........................... 368/21
2008/0123474 A1 * 5/2008 Jung et al. ....................... 368/55
2008/0247276 A1 * 10/2008 Jeong et al. ..................... 368/10
2011/0130139 A1 * 6/2011 Ali et al. .................... 455/435.1

* cited by examiner

*Primary Examiner* — Vit W Miska

(57) ABSTRACT

A system and method for determining local time at an electronic device is disclosed. The system may include an input configured to receive home information for an electronic device. The system may also include a calibration module configured to calibrate the electronic device to a home time zone corresponding to the home information. Calibrating the electronic device may include determining a threshold time value for messages to be transmitted to and received from a home location associated with the home information and generating a time zone database based on the home time zone, and labeling each time zone in the time zone database with a label based on an offset in time from the home time zone. A time value corresponding to time of message transmission to and from the home location may also be determined. The system may also include a processor module configured to determine that the electronic device is within the home time zone in the event the time value is equal to or lesser than the threshold time value, determine that the electronic device is in a new time zone in the event the time value is greater than the threshold value. The new time zone may be calculated based on the time value and the time zone database.

21 Claims, 5 Drawing Sheets

300

400

| Time Zone | PST | | MNT | | CST | | EST | | AST | |
|---|---|---|---|---|---|---|---|---|---|---|
| Label | | 3 | | 2 | | 1 | | 0 | | -1 |
| Primary | San Diego | 10.10.10.9 | Denver | 10.10.10.7 | Chicago | 10.10.10.5 | Boston | 10.10.10.1 | Halifax | 10.10.10.3 |
| Backup #1 | Los Angeles | 10.10.10.10 | Boise | 10.10.10.8 | Alabama | 10.10.10.6 | NYC | 10.10.10.2 | Bermuda | 10.10.10.4 |
| Backup #N | | | | | | | | | | |
| Temp Home | | | | | | | | | | |
| 0 | | | | | | | | | | |

Fig. 4

SYSTEM AND METHOD FOR DETERMINING LOCAL TIME AT AN ELECTRONIC DEVICE

BACKGROUND INFORMATION

A time zone is a region of the Earth that has uniform standard time, usually referred to as the local time. There are approximately twenty-five time zones in the world. Coordinated Universal Time ("UTC") or Greenwich Mean Time ("GMT") is a time standard based on International Atomic Time ("TAI").

Many electronic devices include a time component. When a person travels with an electronic device from one time zone to another, time data in the electronic device may remain unchanged. A person in this scenario could manually adjust the time data in the electronic device to reflect the current time zone or simply leave the time data unchanged. Not only is it burdensome to manually change the time data, but current electronic devices typically have a multiplicity of time-sensitive applications that may require an accurate reflection of the time zone in order to function properly.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 4 depicts an illustrative table for determining time at an electronic device, according to another exemplary embodiment.

DETAILED DESCRIPTION OF EMBODIMENTS

Figure 1:
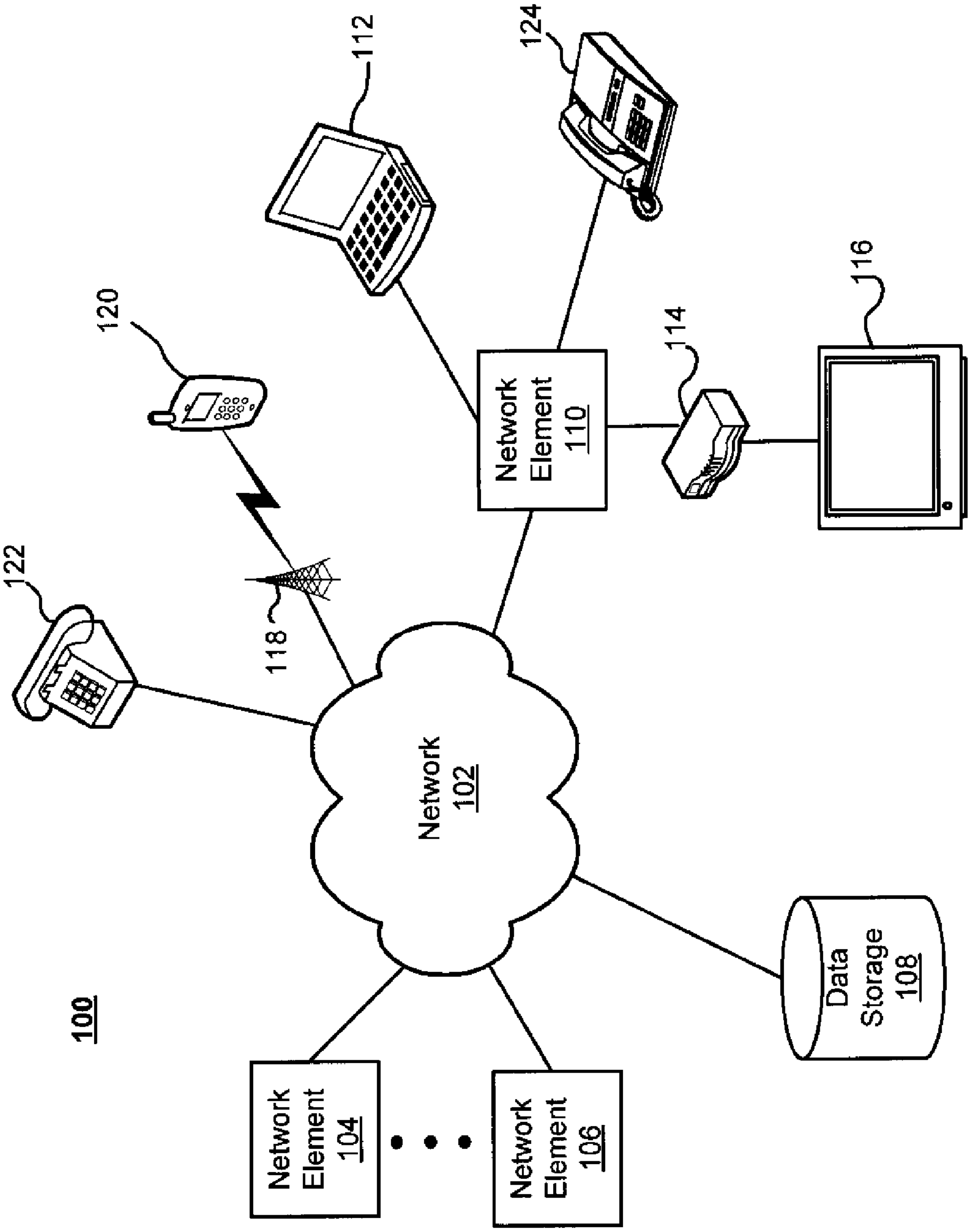
FIG. 1 depicts a block diagram of a system architecture for determining time at an electronic device, according to an exemplary embodiment.

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for determining time (e.g., local time) at an electronic device. That is, exemplary embodiments may, among other things, determine in which time zone with which an electronic device is situated. In particular, exemplary embodiments may further determine, in predetermined intervals, time zone data in an electronic device so that even when the electronic device traverses through one or more time zones, time data in the electronic device may be automatically determined or updated.

As discussed above, when a person travels with an electronic device from one time zone to another, it is not uncommon for time data in the electronic device to remain unchanged or unadjusted to the local time. For example, a person may travel with an electronic device (e.g., a device that uses a TCP/IP protocol suite and is capable of tracking and displaying time zone information). This person may be geographically located in one time zone (e.g., Boston, Mass., U.S.A.) in which his or her device may display time data of that time zone (e.g., Eastern Standard Time ("EST")). If this person travels with his or her electronic to a different geographical location and corresponding time zone, such as Paris, France, the time data in the electronic device may remain unchanged unless it is manually updated. If the person or user does not manually update the time data, he or she may ignore the time data in his or her electronic device. Adjusting the time data in the electronic device may be important, especially for time-sensitive applications on the person's electronic device.

As discussed above, UTC or GMT is a time standard. Using this time standard, time within any time zone may be determined by calculation an offset from UTC or GMT. For example, in the scenario described above, Boston is GMT −5 and Paris is GMT +1. Therefore, the time data in the electronic device that is relocated from Boston to Paris may be adjusted +6 hours in order to display the correct local time in Paris during the person's travels. Such determinations generally hold true for relocation to any of the approximately twenty-five time zones, excluding the current time zone in which the electronic device is presently located.

An application for determining time (e.g., local time) at an electronic device may be provided. By determining local time at the electronic device, the application may effectively be able to determine that an electronic device has relocated from an original time zone to a new time zone. In some embodiments, the application may identify and notify a user, as well as other parties, that the electronic device has relocated. In some embodiments, an option of updating or adjusting time data to reflect the correct local time in the electronic device may be provided. In other embodiments, the application may identify this relocation and automatically adjust time data in the electronic device to reflect the correct local time.

The application for determining that an electronic device has relocated may be based on a determination of local time using any of a multitude of messaging protocols. For example, this may include, but not limited to, Internet Control Message Protocol ("ICMP"). When ICMP is used, a message (e.g., a "ping" message) may be transmitted from the electronic device over a network to a known or registered network location (e.g., a server with a static IP address) in a known time zone. A return message may then be received at the electronic device from the known or registered network location. The return message may include a time stamp indicating time-distance data. The time-distance data indicates the amount of time it took to between the electronic device and the known or registered network location and is reflective of a general network distance between the electronic device and the known or registered network location. In other words, from a statistical standpoint, it should be appreciated that the greater the time it takes for the message and return message to travel through the network, and therefore increase the numerical value of the time stamp, the greater the time-distance data. Thus, using the time stamp information and known time zone information of the network location, the electronic device may be able to determine the current local time at the electronic device.

It should be appreciated that the term, "message," as used herein, may refer to any electronic communication or transmission that is capable of providing time stamp or related information associated with the electronic communication or transmission. For example, these may include "ping" messages used in ICMP, traceroutes, or other message transmissions used in other protocols. It should be appreciated that while embodiments are directed to use of "pings," a variety of other message types or messaging protocols may also be provided. It should be appreciated that use of "pings" and ICMP utility may be a universal and cost efficient protocol.

FIG. 1 depicts a block diagram of a system architecture for determining time at an electronic device, according to an exemplary embodiment. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11 g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VOIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11 g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VOIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported from one location to another. For example, these may include a digital picture frame, an electronic reader device, or other portable device. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

System 100 may be used for mobile telecommunications between two or more components of the system 100, e.g., two or more wireless devices, wireless device with network client, set top box with wireless device, landline phone, VoIP, etc. System 100 may also be used for transmitting or receiving multimedia content. The various components of system 100 as shown in FIG. 1 may be further duplicated, combined or integrated to support various applications and platforms. Additional elements may also be implemented in the systems described above to support various applications.

Figure 2:
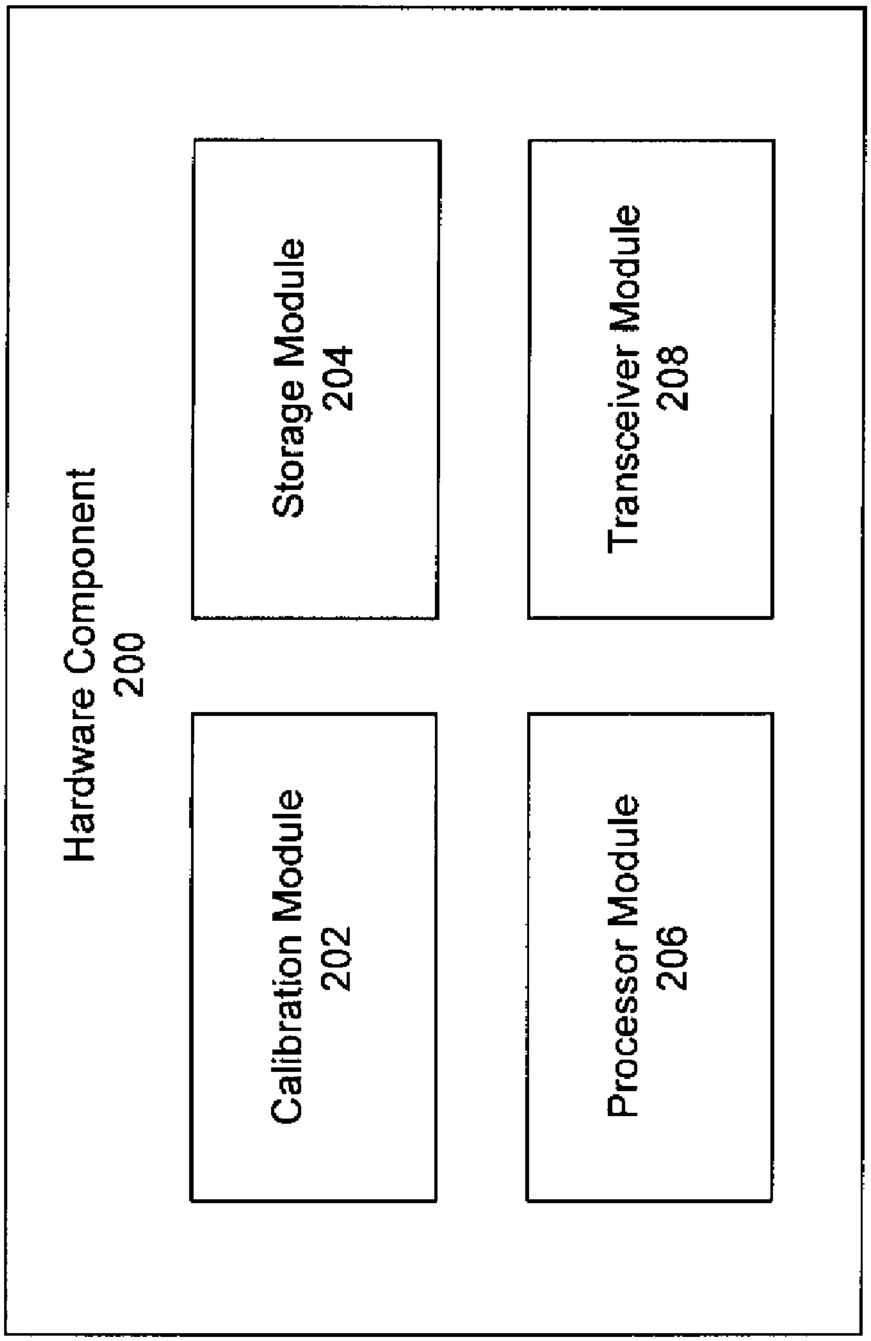
FIG. 2 depicts a block diagram of a hardware component of a system for determining time at an electronic device, according to an exemplary embodiment.

FIG. 2 depicts a block diagram of a hardware component 200 of a system for determining time at an electronic device, according to an exemplary embodiment. Referring to FIG. 2, the hardware component 200 for determining time at an electronic device may include a calibration module 202, a storage module 204, a processor module 206, and a transceiver module 208. The calibration module 202 may be configured to determine home location or time zone using one or more user inputs. The storage module 204 may be configured to store data for determining time. The processor module 206 may be configured to use information from other modules or other components to determine time. The transceiver module 208 may be configured to transmit messages and received message responses (e.g., pings).

While the hardware component 200 may be implemented in portable devices, such as 110, 112, 114, 116, 120, 122, and 122 of FIG. 1, it should be appreciated that the hardware component 200 may be implemented in any of components in FIG. 1. It should also be appreciated that the hardware component 200 may be implemented in any electronic device capable of transmitting/receiving signals and having a time component.

As used herein, the term "module" may be understood to refer to computer executable software, firmware, hardware, or various combinations thereof. Modules however are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The hardware component 200 may allow an electronic device to determine local time. By determining local time at the electronic device, the application may effectively be able to determine whether the electronic device has relocated from an original time zone to a new time zone. In some embodiments, this determination may allow the electronic device to update the time data accordingly.

An initial calibration may be provided to set an electronic device to a particular time zone. This may be achieved by calibrating the electronic device to a predetermined location, such as a server or computing system in major city within a given time zone. This calibration may be used to set a "home location" for the electronic device. Once this is achieved, the hardware component 200 may be calibrated and may have a reference point to determine local time regardless of what location the electronic device may be transported.

Figure 3:
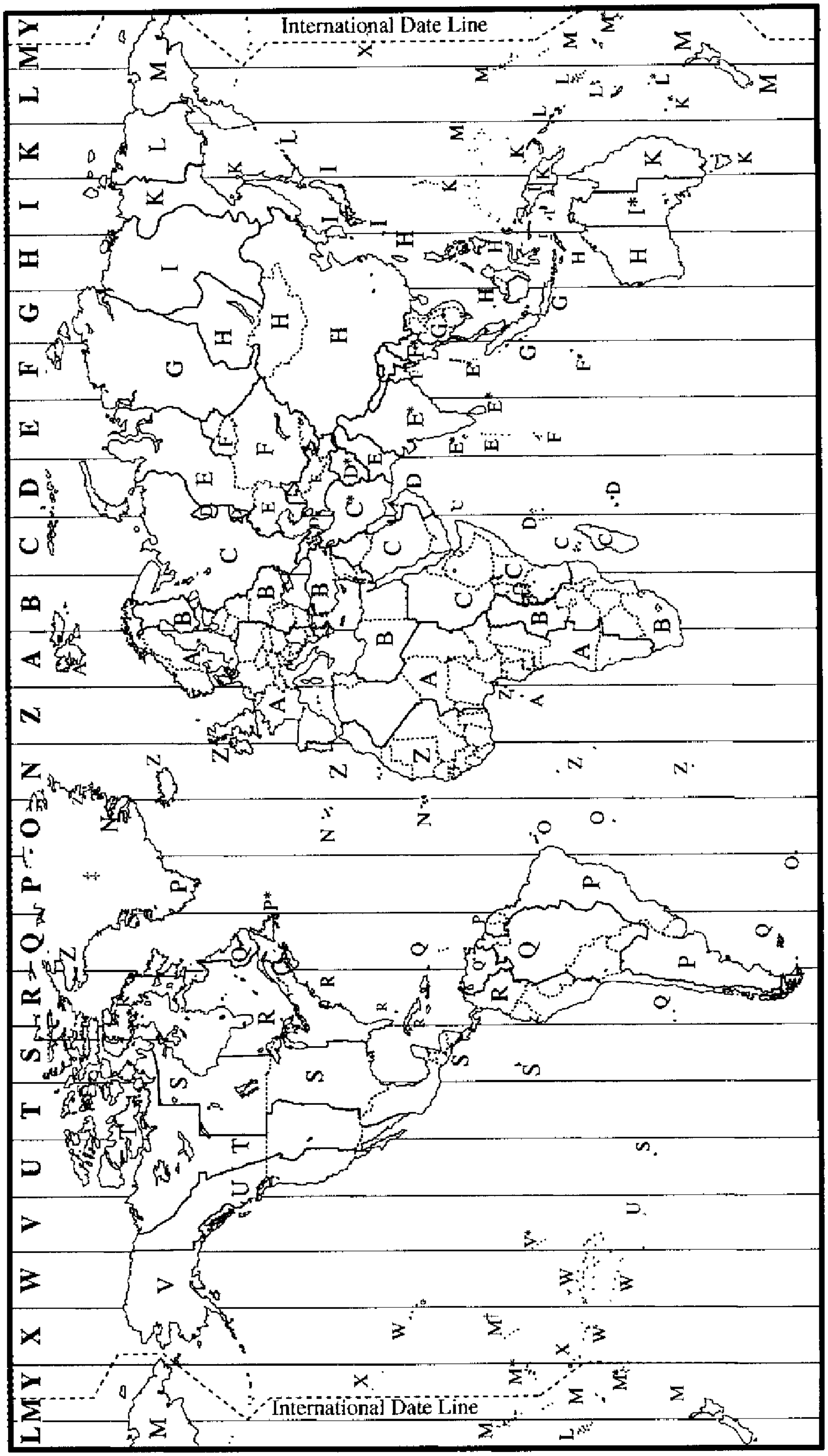
FIG. 3 depicts an illustrative mapping of time zones for determining time at an electronic device, according to an exemplary embodiment.

FIG. 3 depicts an illustrative mapping of time zones 300 for determining time at an electronic device, according to an exemplary embodiment. In this exemplary mapping 300, each letter (e.g., A, B, C, etc.) may represent a time zone. Although the mapping of time zones 300 is particularly detailed, it is illustrative and merely provides a general template from which local time may be determined, as described herein. Although there may be greater or lesser number of time zones than those depicted in the illustrative mapping 300 of FIG. 3 (e.g., depending on daylight savings or other time variations used throughout the world), a description of the embodiments herein are primarily directed to twenty-five (25) time zones for feasibility. It should be appreciated that the hardware component 200 may be configured to determine local time in greater or lesser than twenty-five (25) time zones as well.

FIG. 4 depicts an illustrative table 400 for determining time at an electronic device, according to another exemplary embodiment. The table 400 may show the relation between time zones, labels, a primary IP address (of known city), a backup IP address, and temporary home values. Table 400 may be or stored in one or more databases, e.g., the storage module 204. It should be appreciated that for the purposes of simplicity, table 400 shows information for only five time zones.

In table 400, a fixed and variable "labels" (e.g., an alphanumeric label or other indicator) may be provided for each of twenty-five (25) time zones. Each of the twenty-five (25) time zones may contain entries for at least two local cities and a known static IP or DNS resolvable address for each of the two local cities. Static or fixed IP addresses may provide an unchanging reference point. A dynamic IP address or other automatically assigned address, such as those used with Dynamic Host Configuration Protocol ("DHCP"), may be subject to constant change and may therefore yield unhelpful and inaccurate results. Along with a variable field that uses an alphanumeric representation in the range of +12 to −12 including zero, this information may be used to identify the twenty-five (25) time zones. The twenty-five (25) time zones may be numbered sequentially from the "home" time zone, e.g., 12, 11, 10, 9, 8, 7, 6, 5, 4, 3, 2, 1, 0, −1, −2, −3, −4, −5, −6, −7, −8, −9, −10, −11, −12.

The electronic device may determine its local time once initial "home" location and time has been established. Referring back to the calibration of the electronic device, a user of the electronic device may be prompted, for example, to select a "home" location or time zone, such as those listed in table 400. This would be used to generate the "home" value to be stored in one or more databases. For instance, in the event the user selects "Boston" as his or her "home" location, an application associated with the electronic device may look into one or more databases for a static IP address of a location listed for Boston. In this case, the application may locate an IP address of 10.10.10.1, as depicted in table 400, which may correspond to the IP address of a Boston university, as the "home-primary" address within the application. It should be appreciated that the electronic device may not use the IP address of the user's electronic device as this may likely be a DHCP address or other dynamic address. Rather, the electronic device uses an external static IP address as its "home" location, such as a university or other institution having a static IP address.

Once the "home" location has been established, the labels n table 400 may be shifted with the "home" value receiving "0," and the adjacent values receiving +1 and −1, +2 and −2, . . . +12 and −12. After this action, a "temp home" variable may be set to zero ("0") and periodically, at a predetermined interval of time (e.g., every day, hour, 30 minutes, 15 minutes, 15 seconds, etc.), a "ping" may be transmitted from the hardware component 200 against the value of "temp home-primary" address. In other words, if the "temp home" is zero, the electronic device may "ping" the "home-primary's" IP address, in this case the Boston university. The ping may include a reply message having time data, indicative of how long it took for the ping to transmit and receive a reply. If the result of this ping is less than a predetermined threshold value (e.g., 20 ms), for example, then the electronic device may be understood as being in its original time zone and there no change in time is required.

It should be noted that the value of 20 ms is an exemplary reference value, by way of example, of the application for determining time and is merely representative of one or more statistically computed and averaged values. The following examples may statistically show that the further a distance traveled from a given time zone, the larger a predictable value will be returned from a utility such as an ICMP ping. In each of the following examples, the electronic device pings the "home-primary" address and a few others to show various time-distance reference values.

For example, TABLE 1 depicts a sample ping of an IP address in EST in the same time zone as "home" location of the electronic device. In this case, an electronic device may be located in Boston or other EST time zone and may be pinging the "home-primary" address, e.g., bu.edu (128.197.27.7). Here, the average ping time may be approximately 14 ms.

TABLE 1

| |
|---|
| PING bu.edu (128.197.27.7): 56 data bytes |
| 64 bytes from 128.197.27.7: icmp__seq=0 ttl=242 time=15.488 ms |
| 64 bytes from 128.197.27.7: icmp__seq=1 ttl=242 time=11.095 ms |
| 64 bytes from 128.197.27.7: icmp__seq=2 ttl=242 time=13.035 ms |
| 64 bytes from 128.197.27.7: icmp__seq=3 ttl=242 time=15.397 ms |

TABLE 2 depicts a sample ping of an IP address in the AST time zone, which is one time zone away from EST. This may be equivalent of pinging the "label of the −1 time zone" address. Here, the average ping time may be approximately 38 ms.

TABLE 2

| |
|---|
| PING www.bermudacommerce.com (216.249.40.15): 56 data bytes |
| 64 bytes from 216.249.40.15: icmp__seq=0 ttl=110 time=37.856 ms |
| 64 bytes from 216.249.40.15: icmp__seq=1 ttl=110 time=35.110 ms |
| 64 bytes from 216.249.40.15: icmp__seq=2 ttl=110 time=39.472 ms |
| 64 bytes from 216.249.40.15: icmp__seq=3 ttl=110 time=39.605 ms |

TABLE 3 is a sample ping of an IP address in the CST time zone. This may be equivalent of pinging the "label of the +1 time zone" address. Here, the average ping time may be approximately 46 ms.

TABLE 3

| |
|---|
| PING uchicago.edu (128.135.13.114): 56 data bytes |
| 64 bytes from 128.135.13.114: icmp__seq=0 ttl=241 time=43.765 ms |
| 64 bytes from 128.135.13.114: icmp__seq=1 ttl=241 time=52.947 ms |
| 64 bytes from 128.135.13.114: icmp__seq=2 ttl=241 time=45.361 ms |
| 64 bytes from 128.135.13.114: icmp__seq=3 ttl=241 time=45.265 ms |

TABLE 4 is a sample ping of an IP address in the MNT time zone. This may be equivalent of pinging the "label of the +2 time zone" address. Here, the average ping time is approximately 71 ms.

TABLE 4

| |
|---|
| PING colostate.edu (129.82.103.78): 56 data bytes |
| 64 bytes from 129.82.103.78: icmp__seq=0 ttl=116 time=71.297 ms |
| 64 bytes from 129.82.103.78: icmp__seq=1 ttl=116 time=71.455 ms |
| 64 bytes from 129.82.103.78: icmp__seq=2 ttl=116 time=70.559 ms |
| 64 bytes from 129.82.103.78: icmp__seq=3 ttl=116 time=70.926 ms |

TABLE 5 is a sample ping of an IP address in the PST time zone. This may be equivalent of pinging the "label of the +3 time zone" address. Here, the average ping time is approximately 122 ms.

TABLE 5

| |
|---|
| PING ucla.edu (169.232.56.224): 56 data bytes |
| 64 bytes from 169.232.56.224: icmp__seq=0 ttl=46 time=122.202 ms |
| 64 bytes from 169.232.56.224: icmp__seq=1 ttl=46 time=122.788 ms |
| 64 bytes from 169.232.56.224: icmp__seq=2 ttl=46 time=122.348 ms |
| 64 bytes from 169.232.56.224: icmp__seq=3 ttl=46 time=122.357 ms |

In short, the further the distance of the two TCP/IP devices, the larger the return value of the ICMP ping (which may include a transmitted message and return message having a time element (e.g., time stamp)). It should be appreciated that while IP addresses of universities and financial institutions were used for these statistical computations, other various static or fixed IP address may be used with exemplary embodiments described herein. It should also be appreciated that only a few time zones were provided here by way of example (e.g., PST, MNT, CST, EST, AST), embodiments may apply to a greater or lesser number of time zones.

As shown above, when a return ping value is less than 20 ms may indicate that the electronic device is within the time zone of its home location or address. It should be appreciated that other threshold values may be determined during at least the calibration action described above. The application in the electronic device for determining local time zone may rest or sleep until the predetermined interval of time has passed. Once the time period has expired, the application may "ping"

the "temp home-primary" address again. In the event the returned value is still less than 20 ms, the electronic device may be understood as being in the same time zone, and the application may rest or sleep again until after the predetermined period of time.

In the event the result is greater than 20 ms, for example, the application may recognize that the electronic device has changed location or moved to another time zone. At this point, a second "ping" to "temp home-backup" (e.g., 10.10.10.2) may be performed to assure that the change was not due to a routing problem. If the second "ping" is less than 20 ms, it may be assumed that the electronic device is still local to its registered time zone, and no time zone change may be required. The application may resume rest or sleep mode until the next time period. It should be appreciated that one or more additional pings may be issued to additional backup IP addresses to verify that the electronic device has relocated and to determine whether there is a routing problem.

If, however, the backup ping response is greater than 20 ms, the application may recognize a high probability that the electronic device has changed its location (e.g., to another time zone). The application may then determine in which time zone the electronic device currently resides.

The application in the hardware component 200 may determine to which time zone the device has changed by identifying the value of the last "ping." This value may be used to determine which direction to begin to move toward. The return time of the last "ping" may be used in the following expressions for calculation:

(Area-1=Temp home+(rounddown(return time/20))); and (Area-2=Temp home−(rounddown(return time/20))).

It should be appreciated that these expressions for calculation may be computed by the hardware component 200 using the offset values that correspond to the "labels" to the left and right of the "temp home" label which was initially set to zero, as depicted in table 400 of FIG. 4. For example, if the ping to "temp home-primary" returned a value of 35 ms, Area-1 may calculate to a value of +1 and Area-2 may calculate to a value of −1. The calculation may yield two new label values that may be used for the next sequence. The application may then "ping" Area-1's primary IP address and may "ping" Area-2's primary IP address, and then compare the results of the pings. Whichever value returns the lower result may indicate that it is at a closer distance to that IP address, and therefore, may be more likely within that particular time zone. It should be appreciated that one or more additional "ping" message may be sent to see if the new return results are actually less than 20 ms. If this is the case, then the Area's backup IP address may also be "pinged" to see whether the returned values for the backup IP address is also less than 20 ms. Once this is verified by one or more backup IP address, the electronic device may be able to conclude that it is in a new time zone.

In some embodiments, the user of the electronic device may be prompted via a message (e.g., a pop-up window or other way) to inform the user that his or her electronic device has changed to a different time zone. The electronic device may additionally present an option for the user to change to this new local time accordingly. If the user chooses to update the time to the current time, then he or she may be prompted with the newly calculated time zone.

In some embodiments, two additional options may also be presented. For example, the two adjacent time zones of the newly calculated time zone may be listed as well. For instance, if the application calculated a new time zone at Eastern Europe Time (EET), the user may be prompted with the adjacent time zones (e.g., Central Europe (CET) and Baghdad (BT)) as well. This may be useful in situations where the user knows that his or her electronic device has moved to a new time zone but is so close to the border that the user may not want to change the time setting in the electronic device or change it to the other possible options. Once this has been achieved, the Temp Home may be set to the offset label value of the newly established time zone, which may simply be the numeric value of time zones that the device has moved from its home location. This change may then trigger a sequence to change time data (e.g., an internal clock) in the electronic device and return to the sleep period until the next time zone check.

From here, the application may loop back and calculate the offset of the time zone from the "temp home" value and keep the reference of the home value as the offset of zero. This may allow the application to determine when the electronic device has returned to its original time zone. In some embodiments, when the electronic device relocates back to its original time zone, a "welcome home" notification may be presented, e.g., if "temp home" equals "home." It should be appreciated that if at any point the application is unable to determine the current times, the application may reinitialize to the calibrated "home" setting and restart all calculations from an offset of zero.

In cases where Daylight Savings or other time variations occur, the application may provide one or more ways to factor these changes. In some embodiments, the offset with respect to the device's "home" location and time setting may operate independent of the device's actual time setting. In other words, the electronic device's main time setting, which is typically a function of the operating system, may function entirely independent from the application. Thus, Daylight Savings Tim adjustments may operate in relation to this setting. The application may then adjust time plus or minus to this relative "home" time regardless of what it may be.

It should be appreciated that while embodiments are primarily directed to wireless configurations, wired configurations may also be provided. For example, the electronic device may be configured to communicate via one or more wired communications signals.

While depicted as various servers, components, elements, or devices, it should be appreciated that embodiments may be constructed in software or hardware, as a separate or standalone device, or as part of an integrated transmission or switching device.

Additionally, it should also be appreciated that system support and updating the various components of the system may be easily achieved. For example, a system administrator may have access to one or more of the components of the system, network, components, elements, or device. It should also be appreciated that the one or more servers, components, elements, or devices of the system may not be limited to physical components. These components may be software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, or network elements may include one or more processors for providing communications service to individual units of a multiple dwelling unit. It should be appreciated that one or more data storage systems (e.g., databases) may also be coupled to each of the devices or servers of the system. In one embodiment, the one or more data storage systems may store relevant information for each of the servers and system components.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to clients systems, servers, or other system components. In another embodiment, information stored in the databases may be useful in providing additional personalizations and customizations.

By providing a hardware component 200 for determining local time may benefit a user who has an electronic device to automatically display the correct time wherever they are, and not have to do it manually. It may also provide the user an option to know what time zone they are in if they decide not to change their time to the local/travel time. Furthermore, such a feature may be particularly advantageous for applications that are time-sensitive (e.g., calendar, tasks, electronic banking, etc.).

It should be appreciated that, in some embodiments, an embedded security application may run a background task and instead of prompting the user to change the device's time, it may send an email or other notification to a designated party notifying them that the device has been moved. In other words, a variety of parties may be able to track the general geographical location of an electronic device using the features described above. This may provide a more cost effective and efficient alternative for determining a location of an electronic device.

Figure 5:
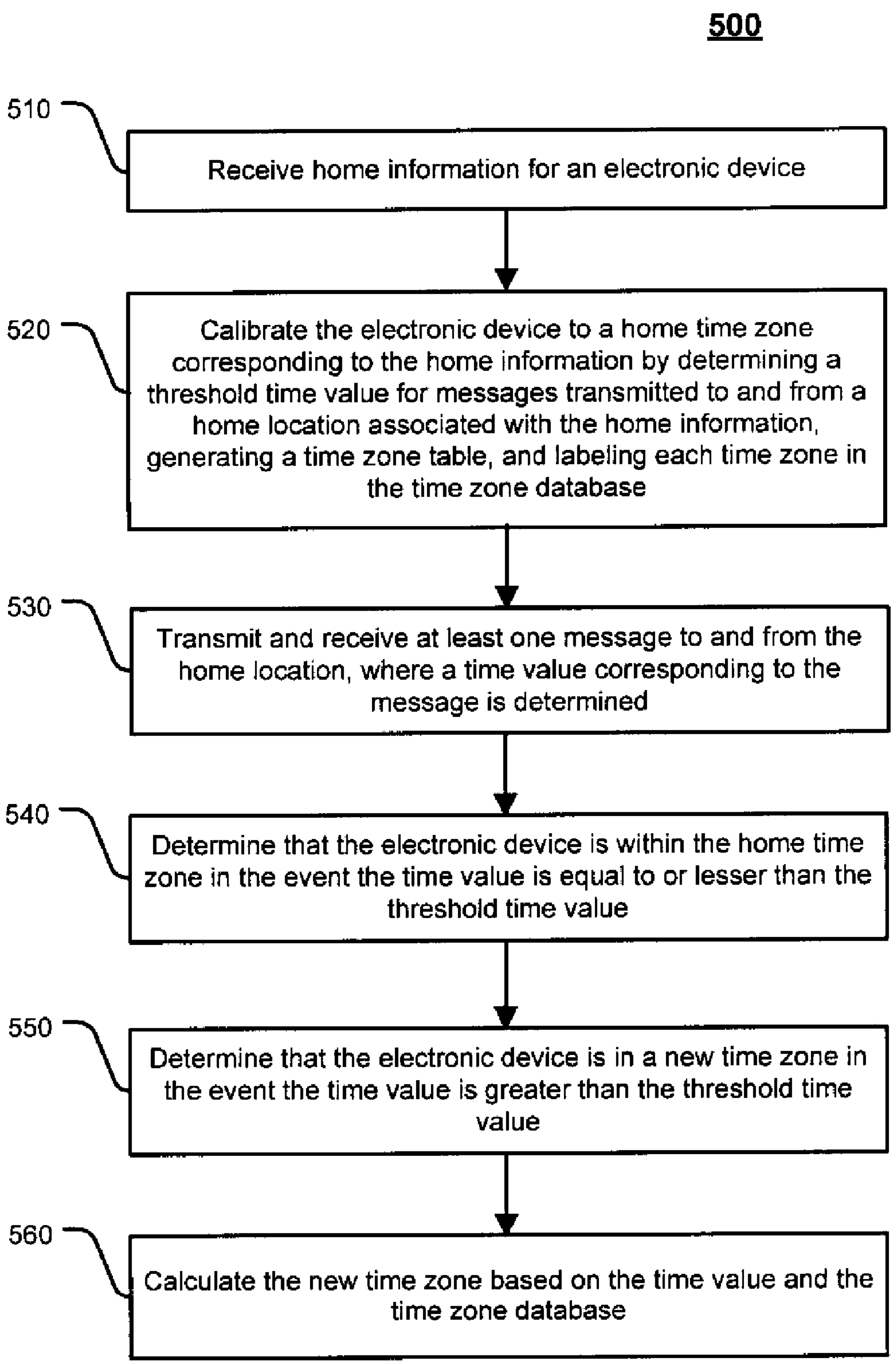
FIG. 5 depicts an illustrative flowchart of a method for determining time at an electronic device, according to another exemplary embodiment.

FIG. 5 depicts an illustrative flowchart of a method for determining time at an electronic device, according to another exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1 and configuration 200 in FIG. 2, by way of example, and various elements of systems 100 and 200 are referenced in explaining the exemplary method of FIG. 5. Each block shown in FIG. 5 represents one or more processes, methods, or subroutines carried in the exemplary method 500. A computer readable medium comprising code to perform the acts of the method 500 may also be provided. Referring to FIG. 5, the exemplary method 500 may begin at block 510.

At block 510, an input at the hardware component 200 may be configured to receive home information for an electronic device. The home information may comprise at least one of an address, a zip code, a telephone number, a time zone, or other information for determining home location. The electronic device may be any device that communicates over a network using TCP/IP protocol. As described above, these may include, but not limited to, a wireline phone, a mobile phone, a personal digital assistant ("PDA"), a computer, a multimedia device, a gaming device, or any other device capable of transmitting and receiving signals.

At block 520, the calibration module 202 may be configured to calibrate the electronic device to a home time zone corresponding to the home information. Calibration of the electronic device may comprises determining a threshold time value for messages to be transmitted to and received from a home location associated with the home information and generating a time zone table based on the home time zone, and labeling each time zone in the time zone table with a label based on an offset in time from the home time zone. In some embodiments, the home location may be at least one of a primary device and one or more backup devices. Each of the primary devices and the one or more backup devices may have at least one static Internet Protocol (IP) address within the time zone corresponding to the home information. The time zone table may show at least the relation between time zones, labels, a primary IP address corresponding to the primary device, at least one backup IP address corresponding to the one or more back up devices, and threshold time values for each time zone. The time zone table may be stored in one or more databases, such as the storage module 204.

At block 530, the transceiver module 208 may be configured to transmit a message to the home location at a predetermined interval and receive a return message from the home location, wherein a time value corresponding to time of message transmission to and from the home location is determined. The predetermined interval may be weeks, days, hours, minutes, or seconds. Other various predetermined time intervals may also be provided. The message and return message may be communicated using Internet Control Message Protocol (ICMP) or other messaging protocol.

At block 540, the processor module 206 may be configured to determine that the electronic device is within the home time zone in the event the time value is equal to or lesser than the threshold time value. The processor module 206 may also be configured to determine that the electronic device is in a new time zone in the event the time value is greater than the threshold value, and calculate the new time zone based on the time value and the time zone table.

At block 550, the processor module 206 may be configured to determine that the electronic device is in a new time zone in the event the time value is greater than the threshold value.

At block 560, the processor module 206 may be configured to calculate the new time zone based on the time value and the time zone table. The processor module 206 may further perform an action at the electronic device based on determining a new time zone. These may include reconfiguring a new home location corresponding to the new time zone, presenting a user-selectable option for updating the time zone at the electronic, automatically updating the time zone at the electronic device, or other related action.

Calculating the new time zone may comprise other various actions. For example, in calculating the new time zone, the processor module 206 may further compare the time value with one or more non-home location threshold time values in the time zone table, determine two non-home location threshold time values numerically closest to the time value, and transmit one or more messages to the primary devices corresponding to the non-home locations. Here, a new time value corresponding to time of message transmission to and from each non-home locations may be determined. Once this new time value is determined, the processor module 206 may be configured to identify a new time zone based on the time zone corresponding to the primary device of new time value that is lowest in numerical value. It should be appreciated that one or more time zone verification actions may be performed by at least transmitting one or more messages to the backup devices corresponding to the non-home locations. Here, the new time value corresponding to time of message transmission to and from each non-home locations may also be determined.

It is to be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In summary, embodiments may provide a system and method for determining time at an electronic device. It should be appreciated that although embodiments are described primarily with time zone determination for devices using TCP/IP, the systems and methods discussed above are provided as merely exemplary and may have other various applications and implementations. For example, location determination of electronic devices may be another implementation.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

I claim:

1. A system, comprising:

an input configured to receive home information for an electronic device;

a calibration module configured to calibrate the electronic device to a home time zone corresponding to the home information, wherein calibrating comprises determining a threshold time value for messages to be transmitted to and received from a home location associated with the home information and generating a time zone database based on the home time zone, and labeling each time zone in the time zone database with a label based on an offset in time from the home time zone;

a transceiver module configured to transmit a message to the home location at a predetermined interval and receive a return message from the home location, wherein a time value corresponding to time of message transmission to and from the home location is determined; and a processor module configured to determine that the electronic device is within the home time zone in the event the time value is equal to or lesser than the threshold time value, determine that the electronic device is in a new time zone in the event the time value is greater than the threshold value, and calculate the new time zone based on the time value and the time zone database.

2. The system of claim 1, wherein the processor module further performs an action at the electronic device based on determining a new time zone.

3. The system of claim 2, wherein the action comprises at least one of reconfiguring a new home location corresponding to the new time zone, presenting a user-selectable option for updating the time zone at the electronic, and automatically updating the time zone at the electronic device.

4. The system of claim 1, wherein the home information comprises at least one of an address, a zip code, a telephone number, and a time zone.

5. The system of claim 1, wherein the electronic device communicates over a network using TCP/IP protocol, the electronic device comprising at least one of a wireline phone, a mobile phone, a personal digital assistant (PDA), a computer, a multimedia device, and a gaming device.

6. The system of claim 1, wherein the message and return message are communicated using Internet Control Message Protocol (ICMP).

7. The system of claim 1, wherein the home location comprises at least one of a primary device and one or more backup devices, wherein each of the primary devices and the one or more backup devices comprises a static Internet Protocol (IP) address within the time zone corresponding to the home information.

8. The system of claim 7, wherein the time zone database shows at least the relation between time zones, labels, a primary IP address corresponding to the primary device, at least one backup IP address corresponding to the one or more back up devices, and threshold time values for each time zone.

9. The system of claim 8, wherein the calculating the new time zone comprises:

comparing the time value with one or more non-home location threshold time values in the time zone database;

determining two non-home location threshold time values numerically closest to the time value;

transmitting one or more messages to the primary devices corresponding to the non-home locations, wherein a new time value corresponding to time of message transmission to and from each non-home locations is determined;

identifying a new time zone based on the time zone corresponding to the primary device of new time value that is lowest in numerical value.

10. The system of claim 9, wherein one or more time zone verification actions is performed by at least transmitting one or more messages to the backup devices corresponding to the non-home locations, wherein a new time value corresponding to time of message transmission to and from each non-home locations is determined.

11. A method, comprising:

receiving home information for an electronic device;

calibrating the electronic device to a home time zone corresponding to the home information, wherein calibrating comprises determining a threshold time value for messages to be transmitted to and received from a home location associated with the home information and generating a time zone database based on the home time zone, and labeling each time zone in the time zone database with a label based on an offset in time from the home time zone;

transmitting a message to the home location at a predetermined interval and receiving a return message from the home location, wherein a time value corresponding to time of message transmission to and from the home location is determined;

determining that the electronic device is within the home time zone in the event the time value is equal to or lesser than the threshold time value;

determining that the electronic device is in a new time zone in the event the time value is greater than the threshold value; and calculating the new time zone based on the time value and the time zone database.

12. The method of claim 11, further comprising performing an action at the electronic device based on determining a new time zone.

13. The method of claim 12, wherein the action comprises at least one of reconfiguring a new home location corresponding to the new time zone, presenting a user-selectable option for updating the time zone at the electronic, and automatically updating the time zone at the electronic device.

14. The method of claim 11, wherein the home information comprises at least one of an address, a zip code, a telephone number, and a time zone.

15. The method of claim 11, wherein the electronic device communicates over a network using TCP/IP protocol, the electronic device comprising at least one of a wireline phone, a mobile phone, a personal digital assistant (PDA), a computer, a multimedia device, and a gaming device.

16. The method of claim 11, wherein the message and return message are communicated using Internet Control Message Protocol (ICMP).

17. The method of claim 11, wherein the home location comprises at least one of a primary device and one or more backup devices, wherein each of the primary devices and the one or more backup devices comprises a static Internet Protocol (IP) address within the time zone corresponding to the home information.

18. The method of claim 17, wherein the time zone database shows at least the relation between time zones, labels, a primary IP address corresponding to the primary device, at least one backup IP address corresponding to the one or more back up devices, and threshold time values for each time zone.

19. The method of claim 18, wherein the calculating the new time zone comprises:

comparing the time value with one or more non-home location threshold time values in the time zone database;

determining two non-home location threshold time values numerically closest to the time value;

transmitting one or more messages to the primary devices corresponding to the non-home locations, wherein a new time value corresponding to time of message transmission to and from each non-home locations is determined; and identifying a new time zone based on the time zone corresponding to the primary device of new time value that is lowest in numerical value.

20. The method of claim 19, wherein one or more time zone verification actions is performed by at least transmitting one or more messages to the backup devices corresponding to the non-home locations, wherein a new time value corresponding to time of message transmission to and from each non-home locations is determined.

21. A computer readable medium comprising code to perform the acts of the method of claim 20.

* * * * *